United States Patent
Qian et al.

(12)

(10) Patent No.: US 6,446,770 B2
(45) Date of Patent: Sep. 10, 2002

(54) BRAKE ROTOR HAVING AN ARRAY OF GROOVES FORMED THEREON

(75) Inventors: Wenqi Qian, Fort Mill, SC (US); Donald L. Burgoon, Gastonia, NC (US); Seen E. Killeen, Charlotte, NC (US)

(73) Assignee: Performance Friction Corporation, Clover, SC (US)

( * ) Notice: Subject to any disclaimer, the term of this patent is extended or adjusted under 35 U.S.C. 154(b) by 0 days.

(21) Appl. No.: 09/820,818

(22) Filed: Mar. 30, 2001

Related U.S. Application Data
(60) Provisional application No. 60/193,442, filed on Mar. 31, 2000.

(51) Int. Cl.$^7$ ............................................... F16D 65/12
(52) U.S. Cl. ........................ 188/218 XL; 188/73.2; 188/250 E; 188/264 AA; 188/71.6
(58) Field of Search ................... 188/218 XL, 73.2, 188/71.6, 264 A, 264 AA, 261, 250 G, 250 E, 58, 59, 264 B; 192/70.14, 113.22, 113.23, 113.36, 107 R, 107 M; 301/6.8

(56) References Cited

U.S. PATENT DOCUMENTS

| | | | |
|---|---|---|---|
| 2,728,421 A | * 12/1955 | Butler | 188/218 XL |
| 3,425,524 A | * 2/1969 | Dewar | 188/218 XL |
| 4,286,694 A | 9/1981 | Wiseman, Jr. et al. | 188/71.5 |
| 4,379,501 A | 4/1983 | Hagiwara et al. | 188/218 |
| 4,995,500 A | 2/1991 | Payvar | 192/107 |
| 5,101,953 A | 4/1992 | Payvar | 192/107 |
| 5,176,236 A | 1/1993 | Ghidorzi et al. | 192/107 |
| 5,474,161 A | 12/1995 | Eaton, III et al. | 188/264 |
| 5,480,007 A | 1/1996 | Hartford | 188/18 A |
| 5,662,192 A | 9/1997 | Kingston et al. | 188/1.11 |
| 5,735,366 A | 4/1998 | Suga et al. | 188/218 |
| 5,765,667 A | 6/1998 | Ross et al. | 188/218 |
| 5,819,888 A | 10/1998 | Tamura et al. | 188/218 |

FOREIGN PATENT DOCUMENTS

| | | |
|---|---|---|
| DE | 2507264 | 9/1976 |
| DE | 2620261 | * 11/1977 |
| DE | 19824465 | * 12/1999 |
| EP | 0 287 017 | 10/1988 |
| GB | 2 268 552 | 1/1994 |
| JP | 62-209234 | 9/1987 |
| JP | 63-259227 | 10/1988 |
| SU | 1484995 A1 | 6/1989 |
| WO | WO 97/43559 | 11/1997 |

OTHER PUBLICATIONS

Stock Car Racing Magazine, Feb. 1997, p. 74, 188/268XL.

* cited by examiner

*Primary Examiner*—Douglas C. Butler
(74) *Attorney, Agent, or Firm*—Pillsbury Winthrop LLP

(57) ABSTRACT

A rotor has an array of grooves formed on the brake pad contact surface. The array is preferably formed as a repeating pattern of regularly spaced grooves. The repeating pattern of grooves creates a plurality of radially and circumferentially offset rings of grooves. The rings can radially overlap. The rotor is preferably ventilated having two brake pad contact surfaces separated by a plurality of vanes. The grooves are preferably arranged on the brake pad contact surfaces between the vanes. The grooves can have various configurations and shapes. The array of grooves increases friction between a brake rotor and brake pads, and decreases the thermal gradient and thermal distortion on the brake pad contact surfaces.

40 Claims, 6 Drawing Sheets

BRAKE ROTOR HAVING AN ARRAY OF GROOVES FORMED THEREON

This application claims the benefit of Provisional Serial No. 60/193,442 filed Mar. 31, 2000.

BACKGROUND OF THE INVENTION

1. Field of Invention

The invention relates to rotors, especially to brake rotors used in high performance vehicles. The invention also relates to ventilated brake rotor assemblies including a pair of spaced brake pad contact surfaces separated by a plurality of vanes.

2. Description of Related Art

Conventional brake assemblies include a brake rotor with a brake pad contact surface for contact with brake pads associated with a vehicle wheel to effect braking. The brake pad contact surface can be an annular ring that engages with the brake pad, which is typically a high friction material, to stop rotation of the brake rotor, which is connected to a hub of a wheel assembly.

High performance vehicles require superior braking power to effect braking at high vehicular speeds and to quickly stop rotation of the vehicle wheel hub assembly. Conventional rotors typically have a smooth brake pad contact surface, which does not provide sufficient friction required for high performance vehicles and heavy duty vehicles. Some prior art rotors have been designed to increase friction by modifying the surface of the rotor to provide some texture.

However, another problem associated with brake rotors, particularly in high performance applications, is the high heat generated across the brake pad contact surface during braking. Heat generation, particularly with increased friction, results in an uneven thermal gradient, thermal distortion of the brake pad contact surface and heat stress that deteriorates the rotor disc. Such heat effects can result in increased replacement and maintenance costs for high performance brake rotor assemblies. None of the prior art assemblies provide a high friction surface that can handle the stresses imposed by heat generated during braking in high performance vehicles.

One known way to handle the heat generated during braking is to use a ventilated brake rotor. This type of brake rotor includes a pair of brake pad contact surfaces spaced from each other, generally by a plurality of spaced vanes or ribs. The vanes or ribs allow air to circulate under the brake pad contact surface for cooling.

However, ventilation alone does not remedy problems associated with non-uniform heat distribution across the brake pad contact surface that can create thermal distortion and frictional instability. Ventilated brake rotors have uneven temperature gradients over their brake pad contact surfaces. This is due to the heat sink capability of the vanes underneath the brake pad contact surfaces. Heat generated on the brake pad contact surfaces on the areas that overlap a vane is directly transferred to the corresponding vane. Heat generated during braking on the brake pad contact surfaces on the areas between vanes is not directly transferred to a vane. Accordingly, the temperature of the brake pad contact surfaces in the areas between vanes is higher than in the areas that overlap a vane. This non-uniform temperature gradient contributes to thermal distortion on the rotor brake pad contact surfaces. The thermal distortion results in non-uniform contact between brake pads and the brake pad contact surfaces which further increases the thermal gradient, causes premature rotor and pad wear, and increases thermal judder and vibration. Thermal distortion further results in thermal checking in the rotor and decreased rotor life.

Further, conventional ventilated rotors do not provide sufficient friction for high performance applications.

SUMMARY OF THE INVENTION

One aspect of the embodiments of the invention is to provide a rotor with a brake pad contact surface that offers superior braking power and performance. The surface can increase friction and stopping power while maintaining frictional stability throughout the braking application.

Another aspect of the embodiments of the invention is to provide a rotor with a brake pad contact surface that reduces the non-uniform temperature distribution (thermal gradient) across the brake pad contact surface during automobile braking. Accordingly, thermal distortion and the numerous problems associated with thermal distortion is minimized.

An additional aspect of the embodiments of the invention is to provide a rotor with a brake pad contact surface that performs with reduced vibration and thermal judder during braking, especially due to the decreased thermal distortion. Accordingly, a decrease in thermal distortion contributes to smooth braking.

A further aspect of the embodiments of the invention is to provide a rotor with a brake pad contact surface in which the thermal gradient across the surface is reduced, resulting in decreased thermal checking and an increase in rotor life.

Also, the embodiments of the invention provide a rotor in which uniform contact is promoted between the rotor and brake pads. Non-uniform contact typically results from thermal distortion. Uniform contact can result in a decrease of taper and radial wear on the pads and an increase in pad life. Uniform contact also can decrease uneven wear. Uniform contact also minimizes undesirable frictional variability between the pads and the brake pad contact surface.

The embodiments of the invention further provide a cleaning characteristic to the brake pads. This cleaning characteristic further decreases the occurrence of a transfer layer on the brake pad contact surface. The cleaning characteristic also cleans pad wear debris from the brake pad contact surfaces. A transfer layer, and pad wear debris contribute to undesirable frictional variability between the pads and the brake pad contact surface. The transfer layer includes brake pad and rotor particles that have been deposited on the brake pad contact surface.

The various design possibilities and optimal design for each particular braking application can be established using finite element analysis based on computer simulations. Goals of the ultimate design can include increasing friction between brake pads and the brake pad contact surface, and decreasing the thermal gradient and thus decreasing thermal distortion on the rotor.

Other aspects, advantages and objects of the invention will become apparent with the description herein, especially when taken in conjunction with the detailed description and drawings.

DETAILED DESCRIPTION OF PREFERRED EMBODIMENTS

It is contemplated that the brake rotor described herein can be used for high performance braking in which braking must occur at high speeds, in race or high performance vehicles for example, or for heavy duty commercial applications in which vehicles have a large gross vehicle weight. However, these applications are merely exemplary, and it is not intended that the invention be limited to such applications or vehicles.

Figure 1:
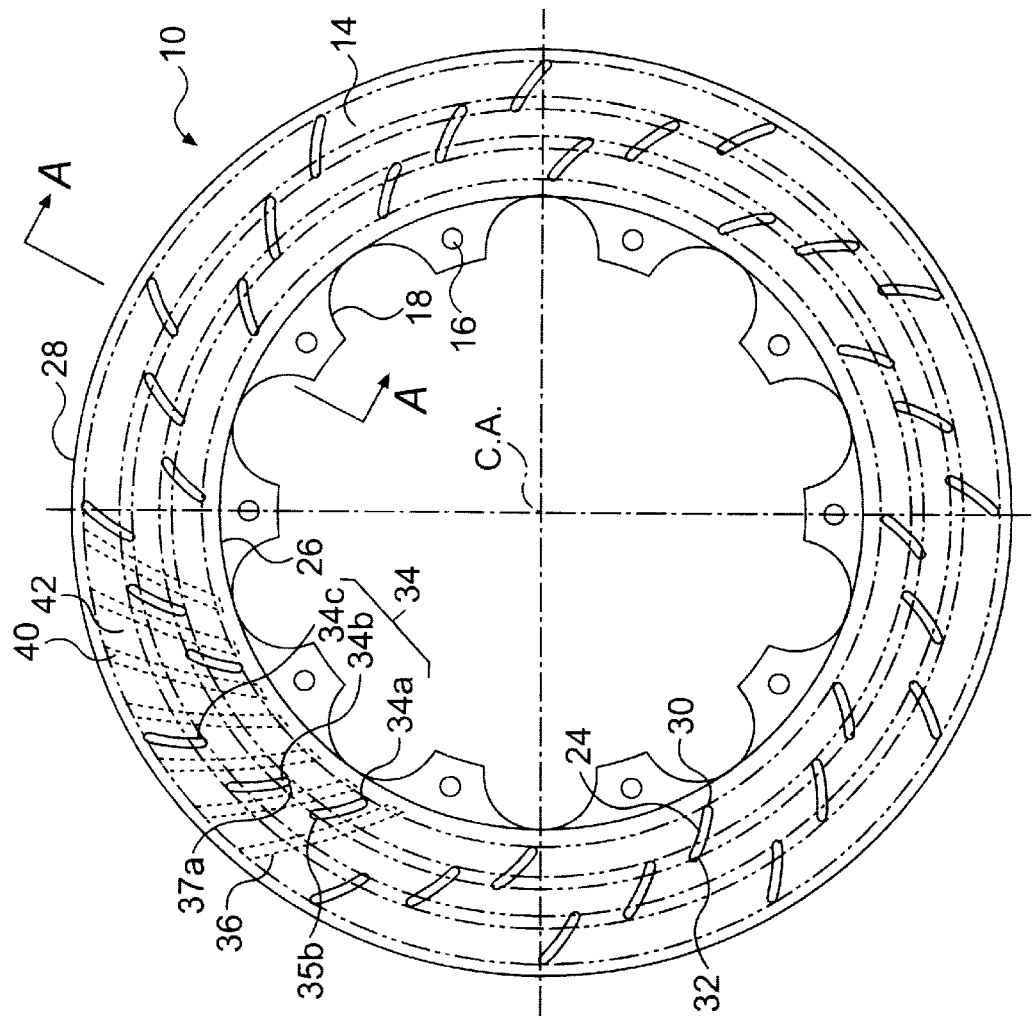
FIG. 1 is a front view of a brake rotor with the grooves formed thereon.
Figure 3:
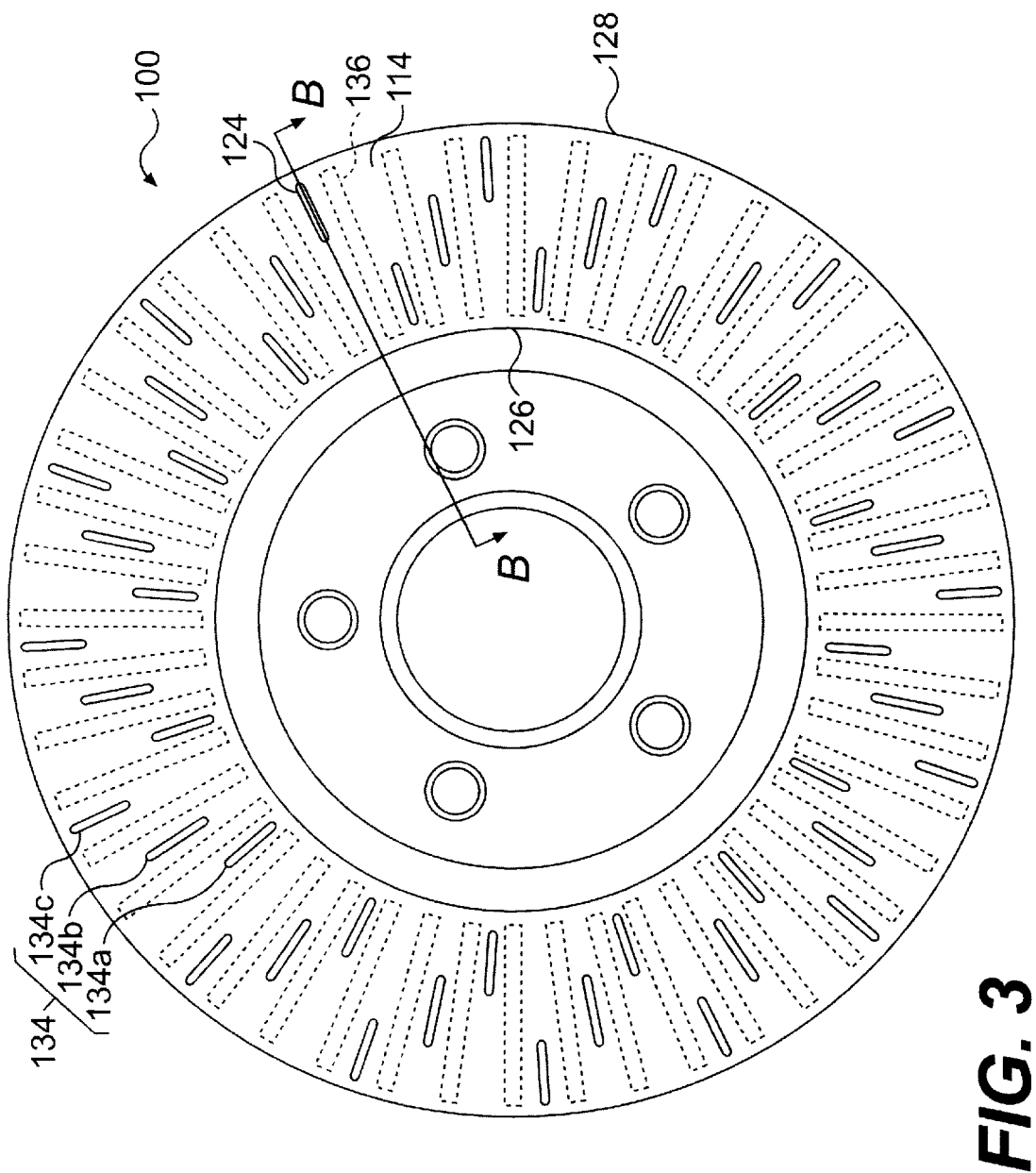
FIG. 3 is a front view of a brake rotor with grooves formed thereon according to another embodiment of the invention.

As seen in FIG. 1, the brake rotor assembly 10 includes a brake pad contact surface 14, shown in the shape of a ring. A plurality of apertures 16 are provided in a flange 18 extending from brake pad contact surface 14. As known, flange 18 can be a continuous ring (as shown in FIG. 3) or, as shown in FIG. 1, a plurality of tabs extending radially inwardly. Apertures 16 are adapted to receive fasteners for connection to a hub assembly, not shown.

Figure 2:
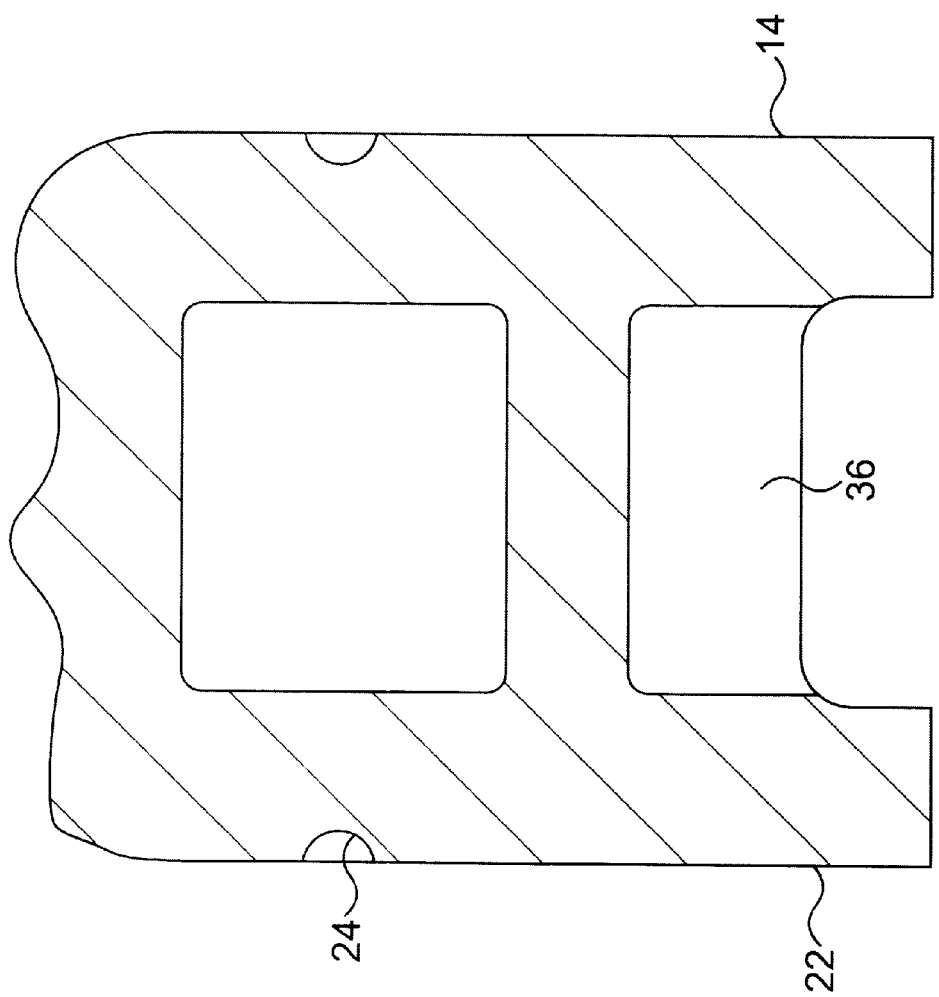
FIG. 2 is a cross section of the rotor assembly of FIG. 1, taken along line A—A, showing grooves formed on each rotor disc.

Preferably, the brake rotor assembly 10 also includes a second brake pad contact surface 22 connected to and spaced from first brake pad contact surface 12, as seen in FIG. 2. A plurality of vanes 36, shown in cross section in FIG. 2 and in phantom in FIG. 1, separate the first brake pad contact surface 14 from the second brake pad contact surface 22. Vanes 36 are circumferentially spaced around the rotor between the brake pad contact surfaces 14 and 22, respectively. Vanes 36 may be spaced in any desired configuration and any number may be used depending on the particular design considerations. Preferably, the vanes are spaced at regular intervals, as is shown in FIG. 1. Vanes may also be straight or arcuate and disposed perpendicular to a tangent to the outer circumference of the rotor or at an angle thereto, as shown in FIG. 1. The first brake pad contact surface 14, and if present the second brake pad contact surface 22, are arranged to face brake pads associated with the vehicle wheel assembly. Upon braking, the brake pads engage the brake pad contact surface 14 and, if so arranged, brake pad contact surface 22 to stop rotation of the rotor and hub assembly and associated vehicle wheel.

The brake pad contact surfaces 14, 22 are ring shaped and are bounded by an inner circumference 26 and an outer circumference 28. The brake pad contact surfaces are adapted for frictional contact with brake pads (not shown) and are typically the only suitable surfaces on the rotor on which contact by brake pads is made. The width of the brake pad contact surface is defined by the radial distance between the inner circumferential boundary 26 and the outer circumferential boundary 28.

The rotor 10 includes an array of grooves on each brake pad contact surface 14, 22. The grooves described herein are also known as trenches or channels, and refer to any formation that embodies an indentation in the rotor surface. Preferably, the groove segments are regularly disposed around the circumference of the brake pad contact surface in repeating patterns, with each pattern including a plurality of groove segments. The array of grooves are shown in FIG. 1 as a repeating pattern 34 of three groove segments 34a, 34b, and 34c regularly spaced around the circumference of the brake pad contact surface. Each groove is a continuous short groove or groove segment 24. Additionally, each groove segment 24 preferably has a length that is less than the width of the brake pad contact surface ring.

In greater detail, the groove pattern 34 shown in FIG. 1 includes three groove segments 34a, 34b, and 34c, which in this example, are radially and circumferentially offset from each other. The groove pattern 34 is repeated around the brake pad contact surface. The repeating pattern of grooves forms a series of concentric rings of groove segments 24. The groove segment 34a is in a first inner concentric ring closest to the inner circumference 26 of the brake pad contact surface. The groove segment 34b is in a second intermediate concentric ring on the brake pad contact surface. The groove segment 34c is in a third outer concentric ring closest to the outer circumference 28 of the brake pad contact surface. The groove segments of the second ring are radially and circumferentially offset from the groove segments of the first ring. The groove segments of the third ring are radially and circumferentially offset from the groove segments of the second ring. Each groove segment shown on the brake pad contact surface is radially and circumferentially offset with respect to an adjacent groove segment.

Each groove segment 24 has a first end 30 and a second end 32 spaced generally radially outwardly from the first end. The first concentric ring of groove segments is arranged such that the groove segments each have first ends disposed adjacent to the inner circumferential boundary 26 and second ends radially outwardly spaced therefrom. The second ring of groove segments is arranged such that the groove segments each have first ends disposed radially inwardly of the second ends of the groove segments in the first ring and second ends disposed radially outwardly spaced therefrom. A radial overlap is thus formed between the first ring and the second ring. This radial overlap is exemplified on the groove segments 34a and 34b. The first end 37a of the groove segment 34b is in overlapping relation to the second end 35b of groove segment 34a, is shown in FIG. 1. Phantom lines have been added to FIG. 1 to show the overlapping relationship of the adjacent concentric rings.

Although not explicitly necessary, this overlap is preferable as the overlap ensures all locations across the width of the brake pads will contact a groove. As the pads pass over the grooves, there is a corresponding increase in friction between the pad and the edge of the grooves. Additionally, the edge of the groove cleans the pad as the pad passes over the groove. If the adjacent grooves were not overlapping, and a radial gap separated the adjacent grooves, portions of the brake pads would remain uncleaned, and uneven wear would occur on the brake pads and the brake pad contact surface. Additionally, a ridge of transfer layer will be deposited on the rotor in the area between the grooves if the grooves are not overlapped.

Vanes 36 are disposed at regular intervals around the circumference of the rotor. As a result, the brake pad contact surface includes overlap locations 40, which directly overlap the vanes, and bridge locations 42, which span the spaced interval between adjacent vanes. As is shown in FIG. 1, each groove segment 24 is positioned within a bridge location 42 spanning the spaced interval between two adjacent vanes 36.

Additionally, the patterns within the groove array in each brake pad contact surface can be aligned with the patterns within the groove array in the opposing brake pad contact surface, or, preferably, the patterns will be unaligned. Groove segments 24 can be any suitable shape, and preferably complement the shape of the vanes. As shown in FIG. 1, the grooves 24 are elongated arcuate grooves. The brake pad contact surface has a central axis of rotation (identified as C.A.) and each groove is angled with respect to a radial line extending from the central axis. However, straight grooves, such as are shown in FIGS. 3, 4, and 5 are also possible.

Figure 4:
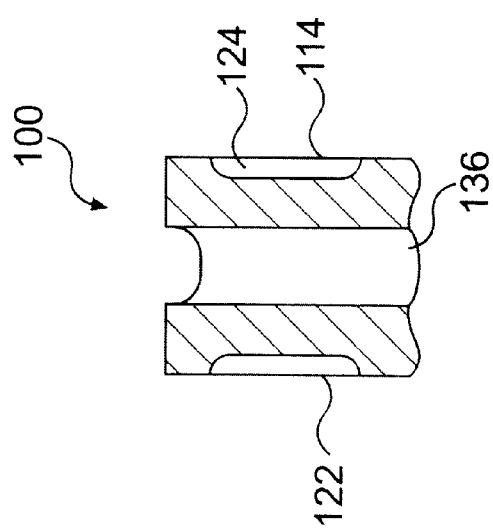
FIG. 4 is a cross section of the rotor assembly of FIG. 3, taken along line B—B, showing grooves formed on each rotor disc.

FIGS. 3 and 4 show another embodiment of the invention. The brake rotor assembly 100 includes a brake pad contact surface 114, shown in the shape of a ring. The brake rotor assembly also includes a second brake pad contact surface 122 connected to and spaced from first brake pad contact surface 114, as seen in FIG. 4. A plurality of straight vanes 136, shown in phantom in FIG. 3, separate the first brake pad contact surface 114 from the second brake pad contact surface 122. Straight vanes 136 are circumferentially spaced around the rotor between the brake pad contact surfaces 114 and 122, respectively. The brake pad contact surfaces 114, 122 are ring shaped and are bounded by an inner circumference 126 and an outer circumference 128. The brake pad contact surfaces are adapted for frictional contact with brake pads (not shown) and are typically the only suitable surfaces on the rotor on which contact by brake pads is made. The width of the brake pad contact surface is defined by the radial distance between the inner circumferential boundary 126 and the outer circumferential boundary 128.

The rotor 100 includes an array of grooves on each brake pad contact surface 114, 122. Each groove is a continuous short groove or groove segment 124. The array of grooves are shown in FIG. 3 as a repeating pattern 134 of three groove segments 134a, 134b, and 134c regularly spaced around the circumference of the brake pad contact surface. Groove segments 134a, 134b, and 134c are radially and circumferentially offset from each other. The groove pattern 134 is repeated around the brake pad contact surface. The repeating pattern of grooves forms a series of concentric rings of groove segments 124. The groove segment 134a is in a first inner concentric ring closest to the inner circumference 126 of the brake pad contact surface. The groove segment 134b is in a second intermediate concentric ring on the brake pad contact surface. The groove segment 134c is in a third outer concentric ring closest to the outer circumference 128 of the brake pad contact surface. The groove segments of the second ring are radially and circumferentially offset from the groove segments of the first ring. The groove segments of the third ring are radially and circumferentially offset from the groove segments of the second ring. Each groove segment shown on the brake pad contact surface is radially and circumferentially offset with respect to an adjacent groove segment.

Figure 5:
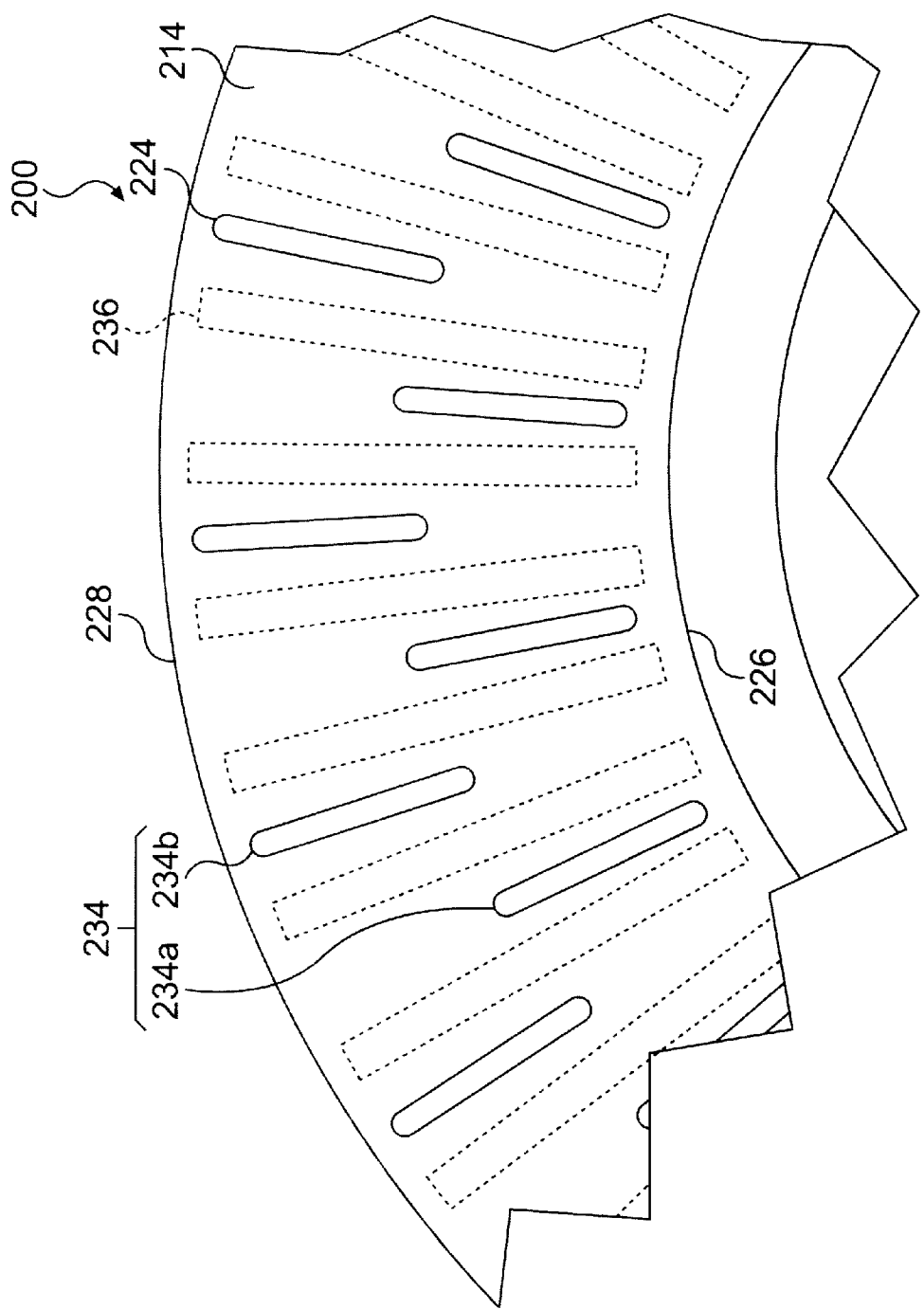
FIG. 5 is a partial front view of a brake rotor with grooves formed thereon according to another embodiment of the invention.

FIG. 5 shows another embodiment of the invention. The brake rotor assembly 200 includes a brake pad contact surface 214, shown in the shape of a ring. A plurality of straight vanes 236, shown in phantom in FIG. 5, separate the first brake pad contact surface 214 from a second brake pad contact surface (not shown). Straight vanes 236 are circumferentially spaced around the rotor between the brake pad contact surfaces. The brake pad contact surface 214 is ring shaped and is bounded by an inner circumference 226 and an outer circumference 228. The brake pad contact surfaces are adapted for frictional contact with brake pads (not shown) and are typically the only suitable surfaces on the rotor on which contact by brake pads is made. The width of the brake pad contact surface is defined by the radial distance between the inner circumferential boundary 226 and the outer circumferential boundary 228.

The rotor 200 includes an array of grooves on the brake pad contact surface 214. Each groove is a continuous short groove or groove segment 224. The array of grooves are shown in FIG. 5 as a repeating pattern 234 of two groove segments 234a and 234b regularly spaced around the circumference of the brake pad contact surface. Groove segments 234a and 234b are radially and circumferentially offset from each other. The groove pattern 234 is repeated around the brake pad contact surface. The repeating pattern of grooves forms a series of concentric rings of groove segments 224. The groove segment 234a is in a first inner concentric ring closest to the inner circumference 226 of the brake pad contact surface. The groove segment 234b is in a second outer concentric ring on the brake pad contact surface closest to the outer circumference 228 of the brake pad contact surface. The groove segments of the second ring are radially and circumferentially offset from the groove segments of the first ring. Each groove segment shown on the brake pad contact surface is radially and circumferentially offset with respect to an adjacent groove segment.

Figure 6:
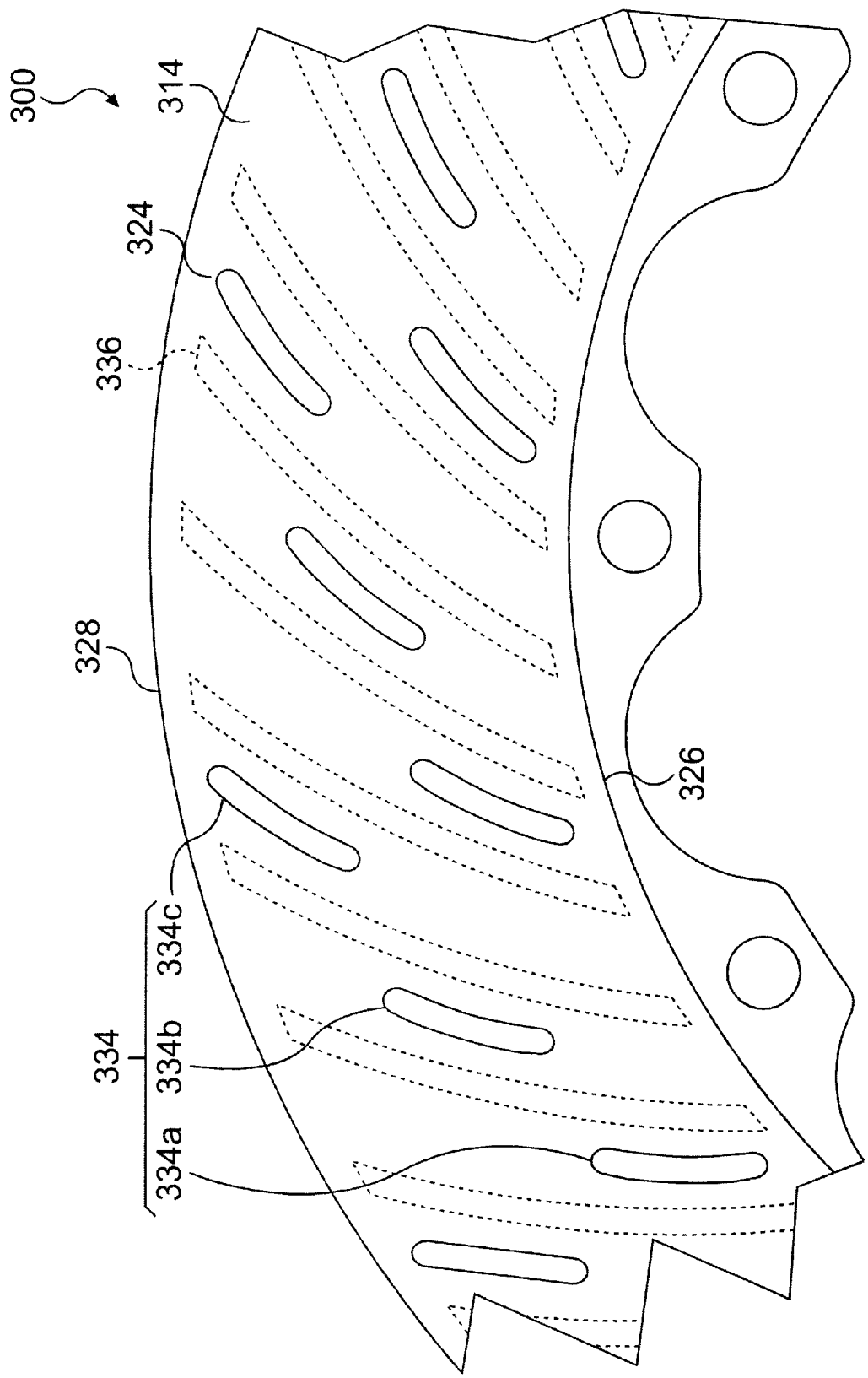
FIG. 6 is a partial front view of a brake rotor with grooves formed thereon according to another embodiment of the invention.

FIG. 6 shows another embodiment of the invention. The brake rotor assembly 300 includes a brake pad contact surface 314, shown in the shape of a ring. The brake rotor assembly also includes a second brake pad contact surface (not shown). A plurality of vanes 336, shown in phantom, separate the first brake pad contact surface 314 from the second brake pad contact. Vanes 336 are circumferentially spaced around the rotor between the brake pad contact surfaces. The brake pad contact surface 314 is ring shaped and is bounded by an inner circumference 326 and an outer circumference 328. The brake pad contact surface is adapted for frictional contact with brake pads (not shown) and is typically the only suitable surfaces on the rotor on which contact by brake pads is made. The width of the brake pad contact surface is defined by the radial distance between the inner circumferential boundary 326 and the outer circumferential boundary 328.

The rotor 300 includes an array of grooves on the brake pad contact surface 314. Each groove is a continuous short groove or groove segment 324. The array of grooves are shown in FIG. 6 as a repeating pattern 334 of three groove segments 334a, 334b, and 334c regularly spaced around the circumference of the brake pad contact surface. Groove segments 334a, 334b, and 334c are radially and circumferentially offset from each other. The groove pattern 334 is repeated around the brake pad contact surface. The repeating pattern of grooves forms a series of concentric rings of groove segments 324. The groove segment 334a is in a first inner concentric ring closest to the inner circumference 326 of the brake pad contact surface. The groove segment 334b is in a second intermediate concentric ring on the brake pad contact surface. The groove segment 334c is in a third outer concentric ring closest to the outer circumference 328 of the brake pad contact surface. The groove segments of the second ring are radially and circumferentially offset from the groove segments of the first ring. The groove segments of the third ring are radially and circumferentially offset from the groove segments of the second ring. Each groove segment shown on the brake pad contact surface is radially and circumferentially offset with respect to an adjacent groove segment.

Figure 7:
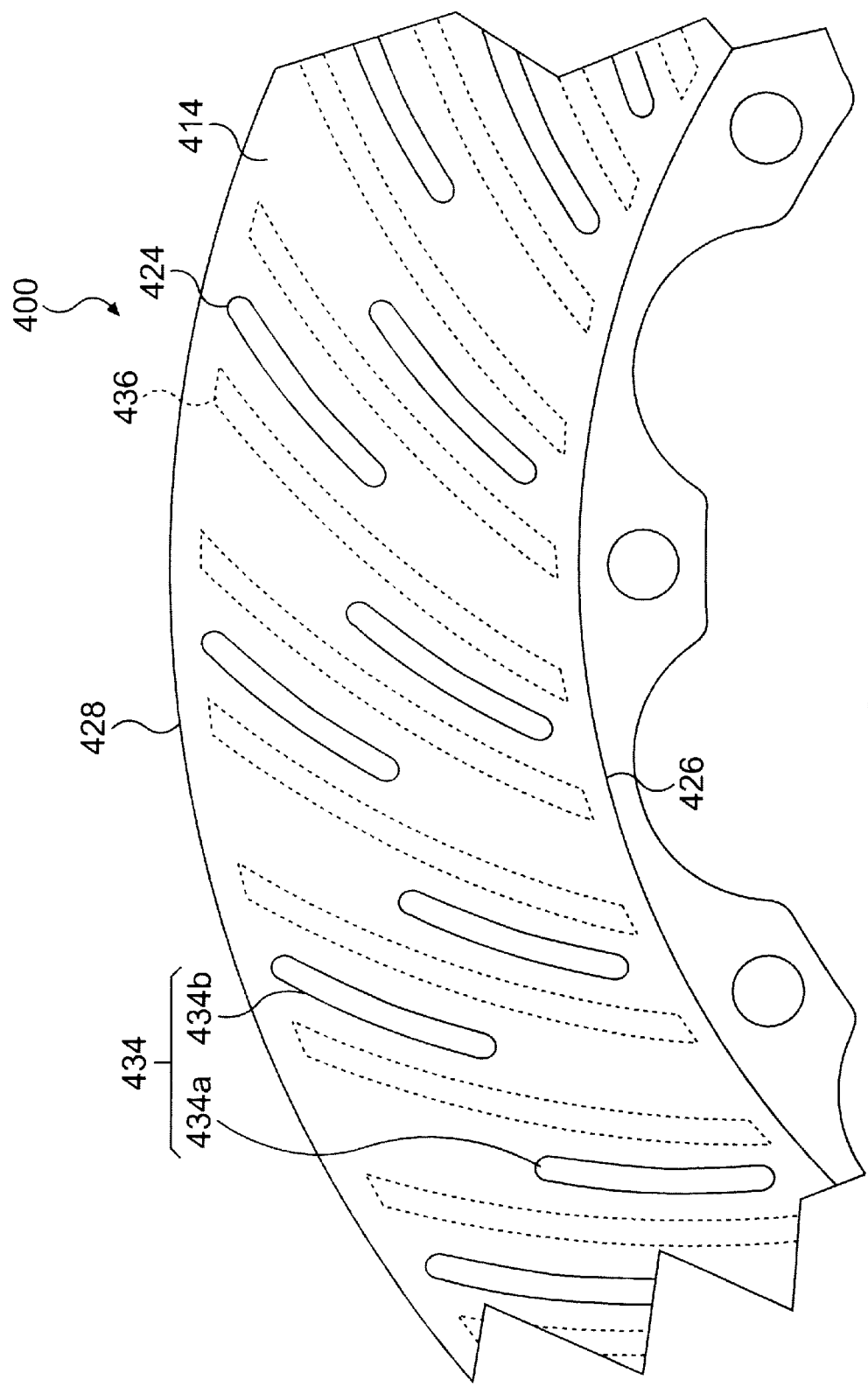
FIG. 7 is a partial front view of a brake rotor with grooves formed thereon according to another embodiment of the invention.

FIG. 7 shows another embodiment of the invention. The brake rotor assembly 400 includes a brake pad contact surface 414, shown in the shape of a ring. A plurality of vanes 436, shown in phantom in FIG. 5, separate the first brake pad contact surface 414 from a second brake pad contact surface (not shown). Vanes 436 are circumferentially spaced around the rotor between the brake pad contact surfaces. The brake pad contact surface 414 is ring shaped and is bounded by an inner circumference 426 and an outer circumference 428. The brake pad contact surfaces are adapted for frictional contact with brake pads (not shown) and are typically the only suitable surfaces on the rotor on which contact by brake pads is made. The width of the brake pad contact surface is defined by the radial distance between the inner circumferential boundary 426 and the outer circumferential boundary 428.

The rotor 400 includes an array of grooves on the brake pad contact surface 414. Each groove is a continuous short groove or groove segment 424. The array of grooves are shown in FIG. 7 as a repeating pattern 434 of two groove segments 434a and 434b regularly spaced around the circumference of the brake pad contact surface. Groove segments 434a and 434b are radially and circumferentially offset from each other. The groove pattern 434 is repeated around the brake pad contact surface. The repeating pattern of grooves forms a series of concentric rings of groove segments 424. The groove segment 434a is in a first inner concentric ring closest to the inner circumference 426 of the brake pad contact surface. The groove segment 434b is in a second outer concentric ring on the brake pad contact surface closest to the outer circumference 428 of the brake pad contact surface. The groove segments of the second ring are radially and circumferentially offset from the groove segments of the first ring. Each groove segment shown on the brake pad contact surface is radially and circumferentially offset with respect to an adjacent groove segment.

A preferable overlap of the groove segments in adjacent rings, as was shown and described in FIG. 1, can also be observed in the embodiments of FIGS. 3, 4, 5, 6, and 7.

As was previously shown in FIG. 1, groove segments are preferably positioned within the bridge locations 42 spanning the spaced interval between two adjacent vanes 36. As is shown in FIG. 1, the repeating patterns of grooves 34 are separated by a bridge location 44 that does not include a groove formed therein.

Alternatively, a groove segment may be disposed within each interval between adjacent vanes, as is illustrated in FIGS. 3, 5, 6, and 7. In addition to providing ventilation to the rotor, the vanes serve as a heat sink for heat generated on the brake pad contact surface. Accordingly in an ungrooved rotor, the locations on the brake pad contact surface between the vanes will be at a higher temperature than the areas overlapping the grooves. In the present invention, the grooves provide an area on the brake pad contact surface where the brake pad does not make frictional contact. The absence of frictional contact at the grooves results in a lower temperature on the brake pad contact surface where the grooves are disposed. As the grooves are disposed between vanes, the grooves serve to minimize the temperature gradient that would otherwise occur between the locations on the brake pad contact surface directly overlapping the vanes and the locations between the vanes. For this reason, it is preferable, although not required to have a groove disposed within the bridge locations spanning the spaced interval between adjacent vanes.

Groove segments may be of any desired depth, preferably shallow and not fully extending through the width of the plate forming the rotor, as seen in FIGS. 2 and 4. Additionally, the edges of the grooves may be of any desired profile configuration, including profiles forming a right angle corner to a gradually sloped chamfered (FIG. 4) or rounded curvilinear corner and variations therebetween. FIG. 2 shows a concave groove segment 24 having a rounded bottom. The particular shape may be dependent on the design and use considerations, including, for example, intended use, performance requirements, materials, cost and maintenance considerations.

The rotor can be made of any suitable material, especially those materials typically used in high performance braking. In these embodiments, the rotor is preferably made from cast iron, with or without an alloy.

The rotor can be made in any suitable configuration including hatless rotor configurations, as is shown in FIG. 1, integral hat rotor configurations, as is shown in FIG. 3, or integral hat and hub rotor configurations, which are not specifically shown.

Upon application of the brake pads against the brake pad contact surface, groove segments increase friction between the brake pad contact surface and the brake pads and provide increased braking power. Also, the grooves provide even temperature distribution across the brake pad contact surface, which leads to less thermal stress, less thermal distortion, and a longer disc life.

While advantageous embodiments have been chosen to illustrate the invention, those skilled in the art will understand that various changes and modifications can be made therein without departing from the scope of the invention.

What is claimed is:

1. A rotor comprising:
   a ring shaped first brake pad contact surface and a second brake pad contact surface spaced from the first brake pad contact surface by a plurality of circumferentially disposed vanes, wherein each contact surface is bounded by an inner circumference and an outer circumference and each vane extends in a direction from the inner circumference toward the outer circumference, wherein at least one of the first and the second brake pad contact surfaces includes an array of grooves formed therein;
   the array of grooves being formed of a circumferentially repeating pattern of groups of groove segments, wherein each group of groove segments includes a plurality of groove segments and each groove segment within a group is radially and circumferentially offset from other groove segments within the group, each groove segment having a length less than the radial distance measured on the surface between the inner circumference and the outer circumference and extending in a direction substantially aligned with an adjacent vane; and
   an attachment portion secured to at least one of the first and the second brake pad contact surfaces.

2. The rotor of claim 1, wherein the groups of groove segments in the array of grooves in the brake pad contact surface form a first ring of circularly arranged groove segments.

3. The rotor of claim 2, wherein the groups of groove segments in the array of grooves in the brake pad contact surface form at least a second ring of circularly arranged groove segments concentrically arranged and radially offset with respect to the first ring.

4. The rotor of claim 3, wherein each groove segment in the second ring of groove segments is circumferentially offset with respect to an adjacent groove segment in the first ring of groove segments.

5. The rotor of claim 3, wherein each groove segment has a first end and an opposed second end, wherein the first ring of groove segments is arranged such that the groove segments in the first ring each have a first end disposed adjacent to the inner edge and a second end radially outwardly spaced therefrom, and the second ring of groove segments is arranged such that the groove segments in the second ring have a first end disposed radially inwardly of the second end of the groove segments in the first ring and a second end disposed radially outwardly spaced therefrom, thus forming a radial overlap between the first ring and the second ring.

6. The rotor of claim 1, wherein each groove segment is an elongated straight segment.

7. The rotor of claim 1, wherein each groove segment is an elongated arcuate segment.

8. The rotor of claim 1, wherein the brake pad contact surface has a central axis of rotation and each groove segment is angled with respect to a radial line extending from the central axis.

9. The rotor of claim 1, wherein the first and the second brake pad contact surfaces include an array of grooves formed therein.

10. The rotor of claim 1, wherein each groove segment is disposed between two adjacent vanes.

11. The rotor of claim 1, wherein a groove segment is disposed on each brake pad contact surface between each pair of adjacent vanes.

12. The rotor of claim 1, wherein the groove segments are discrete, shallow channels formed in the surface of the contact surface.

13. The rotor of claim 12, wherein the groove segments are elongated in a generally radial direction.

14. A ventilated rotor assembly, comprising:
a first brake pad contact surface formed as a ring with a radial width and an array of grooves formed thereon; and
a second brake pad contact surface formed as a ring with a radial width and an array of grooves formed thereon, the second brake pad contact surface being connected to and spaced from the first brake pad contact surface by a plurality of circumferentially spaced vanes,
wherein each array of grooves includes a repeating pattern of groove segments regularly spaced along a circumferential length of each brake pad contact surface, wherein each groove segment has a length less than the radial width of the respective ring and extends generally parallel to an adjacent vane, and wherein the pattern is formed of repeating groups of groove segments, wherein each group includes a plurality of groove segments, with each groove segment being radially and circumferentially offset from other groove segments within the group.

15. The ventilated rotor assembly of claim 14, wherein the grooves are further arranged as a plurality of rings of groove segments.

16. The ventilated rotor assembly of claim 15, wherein each ring of groove segments is radially and circumferentially offset from an adjacent ring.

17. The ventilated rotor assembly of claim 16, wherein groove segments in adjacent rings radially overlap with each other.

18. The ventilated rotor assembly of claim 15, wherein each groove segment is an elongated straight segment.

19. The ventilated rotor assembly of claim 15, wherein each groove segment is an elongated arcuate segment.

20. The ventilated rotor assembly of claim 15, wherein the rotor assembly has a central axis of rotation and each groove segment is disposed at an angle with respect to a radius drawn from the central axis.

21. The ventilated rotor assembly of claim 14, wherein each groove segment is positioned on each brake pad contact surface between two adjacent vanes.

22. The ventilated rotor assembly of claim 21, wherein a groove segment is disposed on each brake pad contact surface between each pair of adjacent vanes.

23. The ventilated rotor assembly of claim 21, further including pairs of adjacent vanes with contact surface therebetween where no groove is disposed.

24. The ventilated rotor assembly of claim 16, wherein each groove segment is a discrete, shallow channel formed in the surface of the respective brake pad contact surface.

25. The ventilated rotor assembly of claim 24, wherein the groove segments are elongated in a generally radial direction.

26. A ventilated rotor assembly, comprising:
a first brake pad contact surface formed as a ring with a radial width and an array of repeating groups of grooves formed thereon; and
a second brake pad contact surface formed as a ring with a radial width and an array of repeating groups of grooves formed thereon, the second brake pad contact surface being connected to and spaced from the first brake pad contact surface by a plurality of circumferentially spaced vanes,
wherein each group of grooves includes a plurality of grooves that are radially and circumferentially offset from each other, and wherein each groove is disposed on the brake pad contact surfaces between adjacent vanes.

27. The ventilated rotor assembly of claim 26, wherein the grooves are farther arranged on each brake pad contact surface as a plurality of rings of groove segments.

28. The ventilated rotor assembly of claim 27, wherein each ring of groove segments is radially and circumferentially offset from an adjacent ring.

29. The ventilated rotor assembly of claim 28, wherein groove segments in adjacent rings radially overlap with each other.

30. The ventilated rotor assembly of claim 26, wherein each groove segment is an elongated straight segment.

31. The ventilated rotor assembly of claim 26, wherein each groove segment is an elongated arcuate segment.

32. The ventilated rotor assembly of claim 26, wherein the rotor assembly has a central axis of rotation and each groove segment is disposed at an angle with respect to a radius drawn from the central axis.

33. The ventilated rotor assembly of claim 26, wherein each groove is a discrete, shallow channel formed in the respective brake pad contact surface.

34. The ventilated rotor assembly of claim 26, wherein each groove extends generally parallel to an adjacent vane.

35. A brake rotor comprising:
a contact surface in a ring shape with an inner circumference and an outer circumference, and;
grooves formed in the contact surface, wherein the grooves are arranged in a repeating pattern around the ring with adjacent grooves being radially and circumferentially offset from each other, and each groove being formed as a shallow elongated channel in the contact surface and having an inner end disposed toward, but spaced from, the inner circumference and an outer end disposed toward, but spaced from, the outer circumference, whereby the inner end of a first groove is disposed a first distance from the inner circumference and the outer end of the first groove is disposed a second distance from the inner circumference greater than the first distance, and the inner end of a second adjacent groove is disposed a third distance from the inner circumference greater than the first distance and less than the second distance, such that a radial overlap between grooves is created.

36. The brake rotor of claim 35, wherein the grooves extend between the inner circumference and the outer circumference inward from the edges of the contact surface.

37. The brake rotor of claim 35, wherein the pattern is formed of at least two rings of grooves, each ring of grooves being circumferentially offset from the adjacent ring of grooves.

38. The brake rotor of claim 35, wherein the pattern includes at least an innermost groove, a middle groove, and an outermost groove.

39. The brake rotor of claim 35, wherein the pattern includes an innermost groove, a plurality of middle grooves radially offset from the innermost groove, and an outermost groove radially offset from the plurality of middle grooves and positioned inward from the outer circumference.

40. The brake rotor of claim 35, wherein each groove is an arcuate segment.

* * * * *